（12） United States Patent
Hinnen et al.

(10) Patent No.: US 10,139,616 B1
(45) Date of Patent: Nov. 27, 2018

(54) DISPLAY ELEMENT WITH OPTICAL STRUCTURE

(71) Applicant: Amazon Technologies, Inc., Seattle, WA (US)

(72) Inventors: Karel Johannes Gerhardus Hinnen, Eindhoven (NL); Tulasi Sridhar Reddy Guntaka, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 24 days.

(21) Appl. No.: 15/086,746

(22) Filed: Mar. 31, 2016

(51) Int. Cl.
*G02B 26/00* (2006.01)
*G02B 26/08* (2006.01)
*G02F 1/29* (2006.01)

(52) U.S. Cl.
CPC .................. *G02B 26/005* (2013.01)

(58) Field of Classification Search
CPC .... G02B 26/005; G02B 5/201; G02B 26/004; G02B 26/02; G02B 26/007; G02B 5/22; G02B 1/06; G02B 2207/115; G02B 1/04; G02B 26/04; G02B 27/0172; G02B 5/003; G02B 26/023; G02B 26/0841; G02B 27/4233; G02B 5/0226; G02B 5/23; G02B 6/0026; G02B 6/006
USPC ................ 359/237, 242, 265–267, 270–273, 359/290–292, 295, 296, 298, 315, 359/321–322; 345/107
See application file for complete search history.

(56) References Cited

U.S. PATENT DOCUMENTS

| | | | |
|---|---|---|---|
| 2010/0225837 A1* | 9/2010 | Seki | G02F 1/135 349/25 |
| 2010/0302615 A1* | 12/2010 | Aubert | G02B 26/004 359/290 |

FOREIGN PATENT DOCUMENTS

WO  2007141218 A1  12/2007

OTHER PUBLICATIONS

3M: "Light Control Films: What is Advanced Light Control Film?", currently available at http://solutions.3m.com/wps/portal/3M/en_US/IndustrialFilms/Home/Products/LightControlFilms, available as of Jan. 16, 2013 per InternetArchive: http://web.archive.org/web/20130116085557/http://solutions.3m.com/wps/portal/3M/en_US/IndustrialFilms/Home/Products/LightControlFilms/, last accessed Mar. 30, 2016.

* cited by examiner

*Primary Examiner* — Brandi Thomas
(74) *Attorney, Agent, or Firm* — EIP US LLP

(57) ABSTRACT

A display element comprising a configurable medium for providing a display effect. The display element is for example an electrowetting element having a first fluid and a second fluid. A first support plate comprises a first support plate surface in contact with at least one of the first fluid or the second fluid, and an electrode. In some examples, an optical structure comprises a first absorbent element and a second absorbent element, with a transmissive layer located therebetween. In other examples, an optical structure comprises a plurality of light conduits.

13 Claims, 5 Drawing Sheets

DISPLAY ELEMENT WITH OPTICAL STRUCTURE

BACKGROUND

Display devices such as those using electrowetting are known which include a so-called black matrix. A black matrix is for example grid shaped and overlaps walls between electrowetting elements. Such a black matrix absorbs light and can improve contrast between adjacent electrowetting elements. However, with a larger black matrix to improve contrast, such a black matrix by absorbing more light can reduce brightness.

It is desirable to improve a black matrix structure.

DETAILED DESCRIPTION

Examples will be described with an optical structure configured to prevent transmission of a light ray of one angle of incidence, but to permit transmission of a different light ray of a different angle of incidence. Hence, the optical structure in examples can be considered to control transmission of light through the support plate, in dependence on angle of incidence and/or location of incidence of a light ray on the support plate. Such an optical structure may be considered in examples to be a so-called black matrix and in some examples may cover the entire display area of a display element, or in other examples may cover part of such a display area in a plurality of such display elements, for example part of all of a wall of a display element.

In some examples, a plurality of absorbent elements for a given wavelength are positioned to form apertures or regions for light to be transmitted therethrough. A size and shape of such an aperture is determined for example by appropriate sizing and positioning of the absorbent elements. In other examples a plurality of absorbent or reflective sheets for a given wavelength may be arranged to form a plurality of light conduits for conveying light of certain angles of incidence therethrough.

Such selective transmission can be used to improve the function of a so called black matrix; a black matrix structure may be made larger (e.g. wider to overlap a greater extent of walls and/or display area(s), to for example prevent transmission through the optical structure of more light rays with oblique angles of incidence, and thus improve contrast. This may be achieved with no or less of a trade-off of brightness compared with known black matrix structures, due to light being selectively transmitted through the optical structure. In fact, brightness may be increased compared with display elements with known black matrix structures, due to the selective transmission, yet still offer a greater contrast compared with known black matrix structures.

Moreover, such selective transmission can be used to form a shadow region beneath the optical structure, to reduce or prevent exposure of components of the electrowetting element to light of a given wavelength, which light may be damaging to such components.

Figure 1:
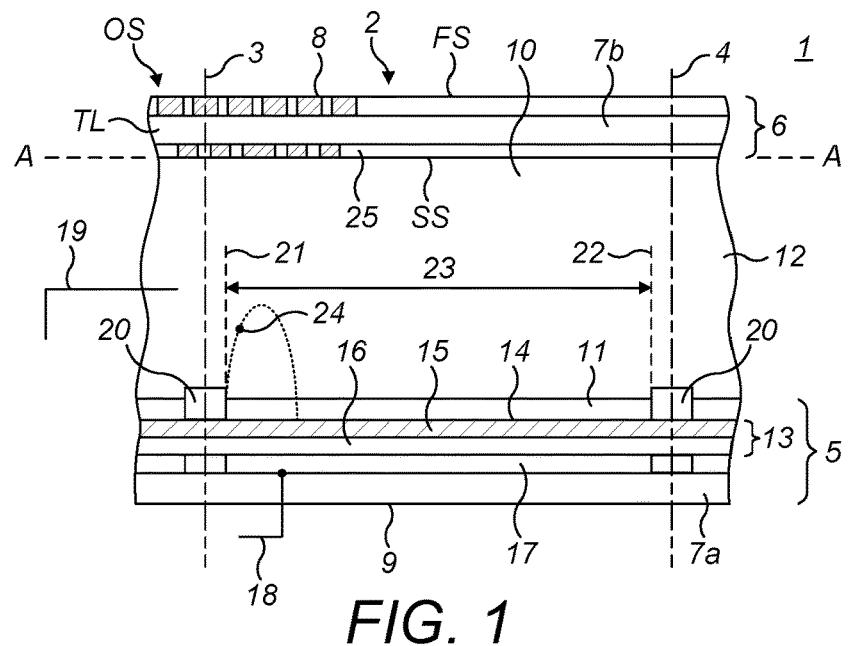
FIG. 1 shows schematically a cross-section of an example electrowetting element.

FIG. 1 shows a diagrammatic cross-section of part of an example of an electrowetting display device 1, which may be referred to as a display device, which includes a plurality of electrowetting elements 2, which may otherwise for example be referred to as picture elements or display elements, one of which is shown in the Figure and which may also be referred to as an electrowetting cell. The lateral extent of the display element is indicated in the Figure by two dashed lines 3, 4. The display elements comprise a first support plate 5 and a second support plate 6. The support plates may be separate parts of each display element, but the support plates may be shared in common by the plurality of display elements. The support plates may each include a glass or polymer substrate 7a, 7b and may be rigid or flexible. The second support plate has a first side FS and a second side SS closer to the first support plate than the first side.

The display device has a viewing side 8 on which an image or display effect formed by the display device can be viewed and a rear side 9. In the Figure a side of the first support plate 5 corresponds with the rear side 9; a side of the second support plate 6 corresponds with the viewing side 8; alternatively, in other examples, a side of the first support plate may correspond with the viewing side. The display device may be of the reflective, transmissive or transflective type. The display device may be an active matrix driven display device. The plurality of display elements may be monochrome. For a color display device the display elements may be divided in groups, each group having a different color; alternatively, an individual display element may be able to show different colors. The viewing side is an example of a surface for receiving incident radiation for entering the display element; such a surface is for example a surface of one of the layers of the second support plate.

The second support plate 6 is positioned such that a first fluid 11 and a second fluid 12 are located between the first 5 and second 6 support plates, in the space 10. At least one of the first and second fluids may be a liquid. The second fluid is immiscible with the first fluid. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface which defines a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

The second fluid is electrically conductive or polar and may be water, or a salt solution such as a solution of potassium chloride in water. In examples, the second fluid is polar and in some examples is electrically conductive, but in other examples is not electrically conductive. The second fluid may be transparent. The first fluid is electrically non-conductive and may for instance be an alkane like hexadecane or may be an oil such as silicone oil. The first fluid is therefore non-polar in at least some examples.

The first fluid may absorb at least a part of the optical spectrum. The first fluid may be transmissive for a part of the optical spectrum, forming a color filter. For this purpose the first fluid may be colored by addition of pigment particles or a dye. Alternatively, the first fluid may be black, for example absorb substantially all parts of the visible spectrum, or reflecting. A reflective first fluid may reflect the entire visible spectrum, making the layer appear white, or part of it, making it have a color. In some examples to be described below, the first fluid is black and therefore absorbs substantially all parts of the optical spectrum, for example in the visible light spectrum. In other examples, the first fluid is another color than black and absorbs another part of the optical spectrum, for example a sub-range of wavelengths within the visible spectrum. In other examples, the display device includes picture elements having first fluids which are respectively red, green or blue, or cyan, magenta and yellow to provide a full color display. Typically, by absorbing substantially all parts of the optical spectrum, there is nonetheless a degree of variation, therefore the first fluid may not absorb all wavelengths, but the majority of wavelengths within a given spectrum such as the visible spectrum, so as to perform the function of the first fluid in the element. The first fluid may therefore be configured to absorb substantially all light incident on the first fluid. For example the first fluid may absorb 90% or more of light in the visible spectrum and incident on the first fluid. Further properties of the first and second fluid are described below.

The support plate 5 includes an insulating layer 13. The insulating layer may be transparent or reflective. The insulating layer 13 may extend between walls 20 of a display element 2. To avoid short circuits between the second fluid 12 and electrodes arranged under the insulating layer, layers of the insulating layer may extend uninterrupted over a plurality of display elements 2, as shown in the Figure. The insulating layer has a surface 14, referred to also herein as a first support plate surface facing the space 10 of the display element 2. In this example the surface 14 is hydrophobic. The thickness of the insulating layer may be less than 2 micrometers and may be less than 1 micrometer. The surface is in contact with at least one of the first fluid or the second fluid, depending on the fluid configuration as described below.

The insulating layer may be a hydrophobic layer; alternatively, it may include a hydrophobic layer 15 and a barrier layer 16 with predetermined dielectric properties, the hydrophobic layer 15 facing the space 10, as shown in the Figure. The hydrophobic layer is schematically illustrated in FIG. 1 and may be formed of Teflon® AF1600. The barrier layer 16 may have a thickness, taken in a direction perpendicular to the plane of the substrate, between 5 nanometers and several micrometers, for example between 50 nanometers and 2 or 3 micrometers. In other examples the thickness may be between 50 nanometers and 500 nanometers. The barrier layer may be made of an inorganic material like silicon oxide or silicon nitride.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each electrowetting element 2, in other words display element, includes a first electrode 17 as part of the first support plate 5, which electrode is at least partly overlapped by the first support plate surface 14. In examples shown there is one such electrode 17 per element. The electrode 17 is electrically insulated from the first and second fluids by the insulating layer 13; electrodes of neighboring display elements are separated by a non-conducting layer. In some examples, further layers may be arranged between the insulating layer 13 and the electrode 17. The electrode 17 can be of any desired shape or form. In examples, each display element 2 may include more than one such electrode as part of the support plate 5. The electrode 17 of a display element is supplied with voltage signals by a signal line 18, schematically indicated in the Figure.

A second signal line 19 is connected to an electrode that is in contact with the conductive second fluid 12. This electrode may be common to all elements, when they are fluidly interconnected by and share the second fluid, uninterrupted by walls. The display element 2 can be controlled by a voltage V applied between the signal lines 18 and 19, which is therefore a voltage applied to the picture element. The electrodes 17 on the substrate 7a are coupled to a control system. In a display device having the picture elements arranged in a matrix form, the electrodes can be coupled to a matrix of control lines on the substrate 7a.

The first fluid 11 in this example is confined to a display element by walls that follow the cross-section of the display element. The extent of the display element, indicated by the dashed lines 3 and 4, is defined by the center of the walls. The area of the surface 14 between the walls of a display element, indicated by the dashed lines 21 and 22, is called the display area 23, over which a display effect occurs. The display effect depends on an extent that the first and second fluids adjoin the surface defined by the display area, in dependence on the magnitude of the applied voltage V described above. The magnitude of the applied voltage V therefore determines the configuration of the first and second fluids within the electrowetting element. In other words, the display effect depends on the configuration of the first and second fluid in the display element, which configuration depends on the magnitude of the voltage applied between the electrodes of the display element. For example, for controlling the configuration of the first and second fluids, a constant potential may be applied to an electrode in contact with the conductive second fluid 12 and the magnitude of a potential applied to the electrode 17 on the substrate 7 may be controlled. The display effect gives rise to a display state of the display element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively.

Therefore, the first fluid 11 adjoins at least part of the display area 23. A size of the part of the display area adjoined by the first fluid depends on a voltage applied between the electrodes of the picture element. In examples described herein, when a zero or substantially zero voltage is applied between the electrodes, for example when the electrowetting element is in an off state, the first fluid 11 forms a layer between the walls, as shown in FIG. 1. Typically, substantially zero in examples refers to a voltage which is minimal, for example as close to zero such that the first fluid adjoins a maximum extent of the display area 23. Application of a voltage will retract the first fluid, for example against a wall as shown by the dashed shape 24 in FIG. 1. The controllable shape of the first fluid, in dependence on the magnitude of applied voltage, is used to operate the picture element as a light valve, providing a display effect over the display area 23. For example, switching the fluids to increase adjoinment of the second fluid 12 with the display area 23 may increase the brightness of the display effect provided by the element.

This display effect determines the display state of the display element which an observer will see when looking towards the viewing side of the display device. The display device is capable of providing display states from black to white, including any intermediate grey state; in a color display device, the display state may also include color.

The second support plate 6 in the example of FIG. 1 comprises at least one layer. The at least one layer includes for example a color filter 25, for example as a layer. The second support plate further comprises an optical structure OS explained in more detail below. The color filter 25 absorbs at least one wavelength of light, for example in the visible spectrum, thus filtering the light passing through the color filter to provide a colored display state; this may be the case in examples where the first fluid is black. The color filter may be formed of a material having a color filtering property, or may comprise a layer of a material transmissive for substantially all, for example 90% or more, wavelengths of light, in for example the visible spectrum, with a coating to act as the color filter. The color filter 25 in the example of FIG. 1 is positioned to overlap a first portion of the first support plate surface, for example the display area, with a second portion of the first support plate surface, different from the first portion, overlapped by the optical structure. The color filter and the optical structure may therefore together cover the display area. In other examples, the color filter may lie over the optical structure, such that the optical structure OS is between the color filter and the space 10. Further examples include a single element which performs the function of the color filter and the optical structure and thus is a combined color filter and optical structure; such examples may comprise a region which acts as the color filter but not the optical structure and a different region which acts as the optical structure but not the color filter. The second support plate 6 in other examples does not include a color filter, for example in cases where the first fluid 11 is appropriately colored, for example due to the addition of a dye or pigment, for providing the color of a display state.

At least one of the first fluid 11 or the second fluid 12 may be susceptible to deterioration by exposure to radiation of at least one predetermined wavelength. Deterioration may be any type of physical or chemical degradation, disintegration or decomposition of the first fluid and/or the second fluid, for example of a component of the first and/or second fluid. Exposure to radiation in examples refers to the radiation being incident on the first and/or second fluid, for example such that the first and/or second fluid are irradiated by the radiation. At least one of the first fluid or the second fluid may be susceptible to exposure to radiation over a sustained or long period of time, for example over a period of operation of the display device of a day or more, either over one continuous period of time or over a plurality of periods of time with a total duration of a day or more. Alternatively, the at least one of the first fluid or the second fluid may be susceptible to exposure to short bursts of radiation, for example an hour or less.

In examples, at least one of the first fluid or the second fluid comprises an additive which is susceptible to deterioration by exposure to the radiation of the at least one predetermined wavelength. The additive may be or comprise a fluid and/or solid particles, for example. The deterioration may be one or more of: a decomposition of the additive, or, with the additive being a colorant, such as a dye or a pigment as explained above, a change of color of the colorant for example due to a decomposition of the chemical structure of the colorant. Such a change of color may be a decoloring, for example a bleaching, for example due to a photobleaching reaction on exposure to radiation. In examples, the decoloring may result in the colorant changing to a different color from its original color. A change of color of the colorant in examples reduces the amount of the colorant having the original, for example desired, color. In such examples, the amount or concentration of the colorant with the original color is reduced compared with an initial amount or concentration of colorant, resulting in decoloring.

In some examples, a deterioration of at least one of the first or second fluids may be a change in electrical properties of the fluid for example due to ion formation from a decomposition of the chemical structure of a component of the fluid. A deterioration of at least one of the first or second fluids can cause a change, for example a decrease, in function or performance of at least one of the first fluid or the second fluid. For example, the deterioration may cause a change, for example a decrease, in switching performance of one or both of the first and second fluids.

It is known to reduce the deterioration of the first or second fluids due to radiation exposure by using fluid compositions which are less susceptible to deterioration or damage by radiation, for example, by using a dye which is chemically less sensitive to photobleaching. Given the many operational requirements of a fluid in an electrowetting display device, identifying suitable alternative chemical compounds which are less susceptible to deterioration is a complex task. The inventors have realized that an optical structure configured as described further below may be used to reduce exposure of the first or second fluids to damaging radiation whilst giving an acceptable display quality.

In examples described herein, for example that of FIG. 1, a second support plate of an electrowetting element comprises an optical structure OS. Typically, an optical structure is any element or collection of elements, which may or may not be integrally formed with each other, but which may be positioned relative to each other, to perform an optical function. The optical structure is configured to transmit a first light ray of a given wavelength from a first side of the optical structure to a second side of the optical structure. In examples, such as those of FIG. 1, the first side of the optical structure is substantially parallel the second side of the optical structure and corresponds with the first side FS, and the second side of the optical structure corresponds with the second side SS, though in other examples the sides of the optical structure may be different sides of a support plate. The given wavelength is for example any predetermined wavelength within the visible light spectrum, and may be one of a plurality of wavelengths which the optical structure is configured to transmit from the first side to the second side. Typically, transmission of light is a property of a material allowing a light ray to pass through, or be conveyed through the material, even though some degree of absorption may occur. The optical structure OS is further configured to prevent transmission of a second light ray of the given wavelength from the first side to the second side, such as the first and second sides FS, SS. Typically, preventing of transmission may in examples be considered a blocking, restricting passage of, or absorption of light, to the extent the light does not pass from the first side to the second side. The first light ray is incident on a point of the first side with a first angle of incidence and the second light ray is incident on the point of the first side with a second angle of incidence. Thus, the optical structure may be considered to control transmission of light through the second support plate in dependence on an angle of incidence of a light ray. In other words the optical structure may be considered to selectively control transmission based on light ray orientation. Further details will be explained using the example of FIGS. 3a and 3b.

Figure 2:
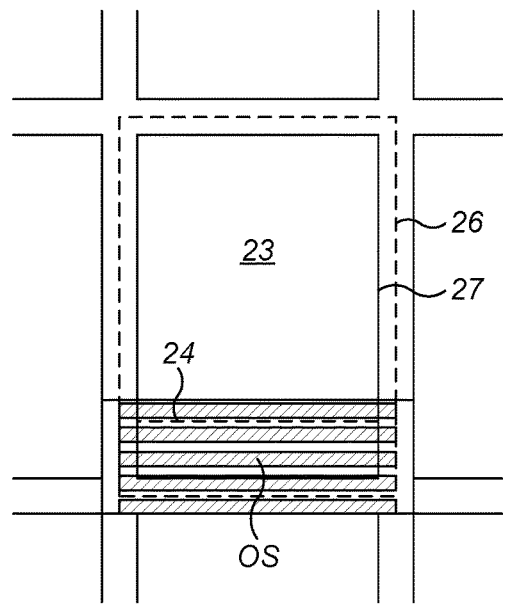
FIG. 2 shows schematically a plan view of the electrowetting element of FIG. 1.
Figure 3A:
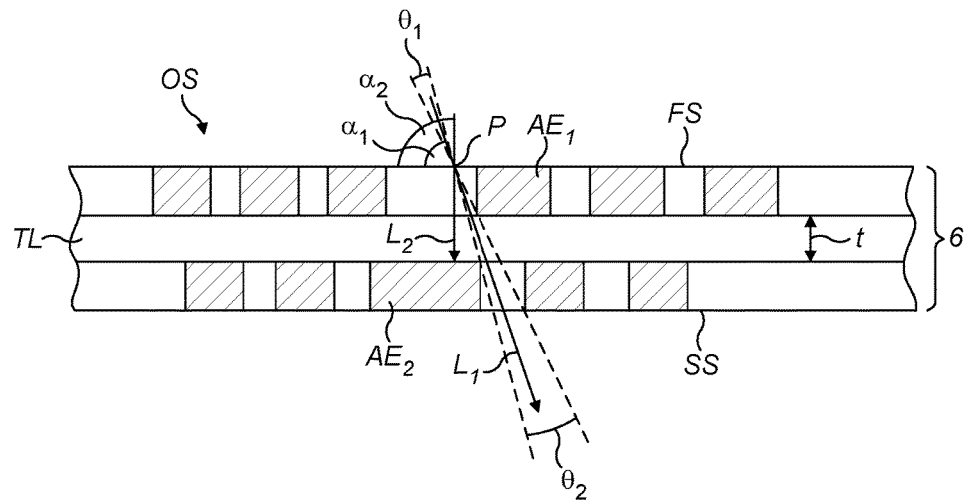
FIGS. 3a and 3b show schematically a cross-section of an example optical structure.
Figure 3B:
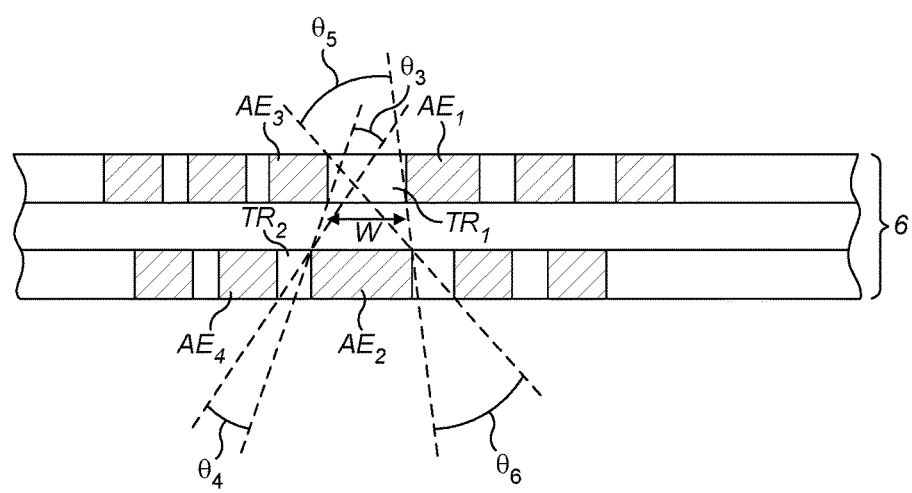

In examples such as that of FIGS. 1 and 2, and as more closely shown in FIGS. 3a and 3b, the optical structure comprises a first absorbent element AE1 and a second absorbent element AE2, each of which is absorbent for light of the given wavelength and which may also be considered to be a light absorbent element. Typically, something that is absorbent absorbs at least 50% of light of the given wavelength, but may absorb more, or in other examples less than 50%. So, something that is absorbent may not be perfectly absorbent, but may be substantially absorbent, with a minority proportion of light of the given wavelength not absorbed, and instead reflected for example.

The first absorbent element is located in the second support plate closer to the first side of the second support plate than the second absorbent element. In some examples, the second support plate further comprises a transmissive layer TL transmissive to light of the given wavelength and located between the first absorbent element and the second absorbent element. The first absorbent element is located between the first side of the optical structure and the transmissive layer, and the second absorbent element is located between the second side of the optical structure and the transmissive layer. In some examples, such as that illustrated using FIGS. 1 and 2, the first absorbent element is part of a first layer of absorbent elements in contact with one side of the transmissive layer TL, and the second absorbent element is part of a second layer of absorbent elements in contact with the other side of the transmissive layer TL.

Referring now to FIG. 3a, the first absorbent element at least partly overlaps the second absorbent element, such that a first lateral extent of the first absorbent element at least partly overlaps a second lateral extent of the second absorbent element, though in other examples the extent of overlap may be greater or less, for example so that one of the first and second absorbent elements entirely covers the other of the first and second absorbent elements, or so that the first and second absorbent elements don't overlap each other.

FIG. 3a illustrates how the optical structure, in this example the first and second absorbent elements, can control transmission of a light ray through the second support plate in dependence on angle of incidence. The first light ray L1 enters the second support plate at a first point P on the first side FS with a first angle of incidence α1. Entering at point P and with the first angle of incidence, the first light ray does not interact with any absorbent element such as the first or second absorbent elements AE1, AE2. Hence the first light ray exits the second side of the second support plate. In contrast, the second light ray L2 enters the second support plate at the same point P but with a second angle of incidence α2 different from the first angle of incidence. Entering at point P but with the second angle of incidence, the second light ray meets and is absorbed by the second absorbent element AE2, such that it does not exit the second support plate.

Depending on the angle of incidence, a light ray may or may not be transmissible through the second support plate. A range of angles of incidence for light rays to be transmitted through the second support plate may therefore be determined. For the example of FIG. 3a, this range is indicated using two dashed lines related to each other by angles θ1 and θ2 which respectively can be considered a range of angles of incidence for transmission of light rays through the second support plate, and a range of angles of light rays emitted from the second support plate. This range corresponds to a first range of angles of incidence within which each light ray of a first plurality of light rays of the given wavelength (including the first light ray L1) and incident on the point P is transmitted from the first side FS to the second side SS. A second range of angles of incidence outside the first range of angles of incidence corresponds to a range of angles within which each light ray of a second plurality of light rays of the given wavelength (including the second light ray L2) and incident on the point P is prevented from transmission from the first side FS to the second side SS. In some examples, the second range of angles of incidence may be all angles between 0 and 180 degrees relative to the first side which exclude angles within the first range of angles of incidence. Typically, for a value such as an angle being within a range, the value may be a maximum or minimum value of the range as well as a value within the maximum and minimum values.

From this range of angles it can be considered that the second support plate comprises a first transmissive portion of the optical structure between the first absorbent element and the second absorbent element for selectively transmitting light in dependence on angle of incidence. As will be appreciated, the size of the first transmissive portion may be determined by at least one of a separation between the first absorbent element and the second absorbent element (for example in dependence on a thickness t of the transmissive layer TL) or a thickness of the transmissive layer. The first transmissive portion may have for example a slit or slot shape.

An absorbent element described herein is, in examples such as that of FIGS. 1, 2, 3a and 3b a portion of a layer, which portion has for example a longitudinal shape and a lateral extent overlapping a portion of the display area. The longitudinal shape may extend across a lateral extent of the display area, for example in a plane perpendicular that of FIG. 1, as shown in FIG. 2 which is taken in the plane A - - - A of FIG. 1. Thus, multiple such absorbent elements having a pattern in a patterned layer may form a grill pattern for example with each absorbent element spaced from and substantially parallel (within acceptable tolerances) an adjacent absorbent element. Between two adjacent absorbent elements there may be a transmissive region, for example a space or a gap, or in other examples comprising a transmissive material such as an optically transparent photoresist material for transmitting light of the given wavelength. A first plurality of such substantially parallel absorbent elements arranged according to a first pattern may be considered to be a first grill and a second plurality of such substantially parallel absorbent elements arranged according to a second pattern on an opposite side of the transmissive layer may be considered to be a second grill. A skilled person would readily understand how one or many patterned layers of absorbent elements may be formed, with suitable deposition, photolithography and/masking techniques, for example.

Referring to FIG. 2, the lateral dimension of the central electrowetting element in FIG. 2, corresponding to the dashed lines 3 and 4 of the element 2 in FIG. 1, is indicated by the dashed line 26. Line 27 indicates the inner border of a wall; the line is also the edge, for example a perimeter, of the display area 23. The dashed line 24 marks the boundary between the first fluid 11 and the second fluid 12 when the first voltage is applied to the picture element 2.

As understood from FIG. 3a, there may be two such layers comprising absorbent elements, for example with each layer on different sides of the transmissive layer TL. In further examples, there may be more than two such layers.

Although particular examples are described herein of absorbent element shapes, sizes and positioning relative to other absorbent elements, it is to be appreciated that in further examples any of these parameters such as shape and size may be adjusted to obtain the desired functionality of the optical structure.

In examples, the absorbent material is a photoresist including a material which absorbs at least light of the given wavelength, and which may absorb substantially all visible light. Hence, such an absorbent element may be black in color, and may be considered to be part of a black matrix structure as will be readily understood by one of skill in the art. Such a black matrix may be used to improve contrast between adjacent electrowetting elements, for example by blocking light emitted or reflected from a region underneath the walls, whilst maintaining or improving brightness due to the selective transmission of light. Such black matrix functionality may be combined with the optical structure functionality described herein. This applies also for examples described below with absorbent or reflective sheets or surfaces.

It is also to be noted that angles of incidence described herein relate to angles taken in the plane of FIG. 1 for example. For the optical structures described in examples herein, an angle of incidence taken in a plane perpendicular the plane of FIG. 1 is not relevant for the selective transmission of light rays, but may be in other examples with a differently designed optical structure.

Referring to FIG. 3b, which shows the optical structure of FIG. 3a, further functionality will be described. FIG. 3a was used to explain selective transmission based on two absorbent elements. It is to be appreciated that more than two absorbent elements may be used in the optical structure. Indeed, each layer of absorbent elements may comprise two or more absorbent elements. Hence, in examples, in addition to the first and second absorbent elements, the optical structure may comprise at least a third absorbent element AE3 absorbent for the given wavelength which is for example located at (e.g. in contact with) the first side of the transmissive layer TL. A first transmissive region TR1 is located between the first and third absorbent elements, for example having a width w corresponding to, for example equal to, a spacing between the first and third absorbent elements. A lateral extent of the second absorbent element may at least partly overlap a lateral extent of the first transmissive region.

In some further examples, such as that of FIG. 3b, the optical structure may also comprise a fourth absorbent element AE4 absorbent for the given wavelength and a second transmissive region TR2 located between the second and fourth absorbent elements, for example having a width (in a parallel direction to that width of the first transmissive region TR1) corresponding to, for example equal to, a spacing between the second and fourth absorbent elements.

Using a third absorbent element and in some examples a fourth absorbent element, a first range of angles of incidence of a first plurality of light rays (including the first light ray) may be determined for transmission from the first side to the second side, via the first transmissive region. It is to be noted that, not just light rays incident on the point P are selected for transmission through the second plate in dependence on angle of incidence. Light rays incident anywhere on the first transmissive region for example are subject to such angle of incidence dependence selection. Hence, a first range of angles of incidence across a width of the first transmissive region TR1 and transmissible through the second support plate may be greater than for light rays incident on the point P. Such a first range of angles of incidence is indicated in FIG. 3b by angle θ5 and angle θ6 for a range of emitted light rays. A second range of angles of incidence outside the first range of angles of incidence of a second plurality of light rays of the given wavelength are prevented from transmission from the first side to the second side via the transmissive region, with the second plurality of light rays comprising the second light ray.

As illustrated in FIG. 3b, the principles of the first range of angles of incidence and the second range of angles of incidence outside of the first range of angles of incidence can be applied for light also incident on the first transmissive region TR1 and where appropriate being transmitted through the second transmissive region TR2. Hence a third range of angles of incidence of a third plurality of light rays transmissible from the first side to the second side, via the first and second transmissive regions, is determined as indicated in FIG. 3b by angle θ3 (and θ4 for a range of emitted light rays), together with a fourth range of angles of incidence outside of the third range of angles of incidence, for a fourth plurality of light rays which are prevented from transmission from the first side to the second side, via the first and second transmissive regions. In this way, there may be considered to be a second transmissive portion of the optical structure between the second and third absorbent elements, a size of which is determined at least by one of a separation between the second and third absorbent elements or a thickness of the transmissive layer.

As will be understood, at least one of a separation between the first and second absorbent elements, an extent of overlap of the first and second absorbent elements, or a width of at least one of the first and second transmissive regions at least partly determines the size of the first and third ranges of angles of incidence (and also a size of the second aperture).

It is to be noted that although examples are described with the first, second, third and in some examples fourth absorbent elements, it is envisaged in further examples that the second support plate comprises the first, second and fourth absorbent elements but without the third absorbent element.

As will be appreciated, for at least one range of angles of incidence for which light rays are prevented from transmission from the first side to the second side, a shadow region is created beneath the second support plate which corresponds to an absence of light. Edges of the shadow region correspond with edges of regions of light rays having been transmitted through the second support plate.

Indeed, such a shadow region may be a combination of individual shadow regions from respective ranges of angles of incidence for light prevented from transmission corresponding to different absorbent elements, in combination with regions of light having been transmitted through the second support plate.

The optical structure may be designed such that the shadow region at least partly coincides with part of the electrowetting element to be protected or shielded from light, for example of a potentially damaging wavelength. For example, the optical structure may overlap a fluid retraction region corresponding with a region between the first and second support plates which is at least partly occupied by the first fluid upon application of a non-zero voltage between the electrode and the second fluid. For example the fluid retraction region may correspond with the form of the first fluid indicated with dashed line 24. Hence, with appropriate positioning of the optical structure, and therefore of the absorbent elements, over the fluid retraction region, incident light which would otherwise pass into the fluid retraction region is prevented from such passage, by being absorbed or reflected by the optical structure.

In this way, incident light of the given wavelength, which may be damaging for example to a dye of the first fluid, can be prevented or reduced from interacting with the first fluid, thus for example extending the lifetime of a dye in the first fluid from undesired photobleaching.

It is to be understood that although first, second, third and fourth absorbent elements have been described in examples, the principles described in respect of the these absorbent elements apply to further absorbent elements absorbent for light of the given wavelength, for example additional absorbent elements illustrated in FIGS. 3a and 3b but which are not explicitly described for the sake of conciseness.

The specific design of the optical structure, for example a width of a transmissive region between two adjacent absorbent elements, an extent of overlap and/or offset of two absorbent elements separated by the transmissive layer, and/or a pitch of a series of absorbent elements may be determined in a design process to obtain a desired shadow region shape, taking into account other factors such as material properties and dimensions of parts of the electrowetting element. In some examples, the width of a transmissive region between two adjacent absorbent elements and/or the offset may be designed to decrease towards a central region of the optical structure, for example within a patterned layer of absorbent elements; this can decrease an amount of light allowed to be transmitted through the second support plate nearer the central region, thus forming a larger shadow region. In other examples a uniform range of angles of incidence may be designed for each transmissive region between two adjacent absorbent elements of a series of absorbent elements in a layer.

In examples, the first support plate includes at least one electronic component used for applying the voltage to the picture element, with the radiation filter substantially covering the at least one electronic component. In examples, the at least one electronic component comprises one or more of: a transistor, for example a thin-film transistor (TFT), a capacitor, or a control line. The optical structure may be configured and located such that at least one shadow region coincides with the at least one electronic component, which may lie underneath a wall of the electrowetting element. In this way, the at least one electronic component is protected from damage by light of the given wavelength. In an example the at least one electronic component is a transistor such as a TFT for controlling application of a voltage to the electrowetting element. Thus, the optical structure can prevent light of the given wavelength from reaching the transistor, reducing the leakage current of the transistor and improving the performance of the display device.

In examples, the electrowetting element may be configured to determine a preferential direction of motion of the first fluid upon application of a voltage, as will be readily understood by the person skilled in the art, for example by using a surface 14 with a non-planar surface. Thus, the first fluid may tend to move towards a predetermined area upon application of a voltage. The predetermined area may be considered to act as a collection area for the first fluid 11.

In examples, the optical structure covers at least part of the collection area. This reduces exposure of the first fluid to light of the given wavelength when retracted, reducing the deterioration of the first fluid due to radiation damage. This can increase the lifetime of the display device.

In examples, the given wavelength is one or more of the following wavelengths: at least one wavelength in the range of about 100 to about 380 nanometers, at least one wavelength in the range of about 380 to about 700 nanometers or at least one wavelength in the range of about 700 nanometers to about 1000 nanometers. Typically, about includes a degree of variation, therefore the at least one wavelength may be within the range of wavelengths within acceptable measurement uncertainties, for example within 10% of the upper or lower bound of the range of wavelengths. In an example, given wavelength is one or more of: at least one wavelength in the ultraviolet range of the electromagnetic spectrum, for example within the range of 100 to 380 nanometers, at least one wavelength in the visible light range of the electromagnetic spectrum, for example within the range of 380 to 700 nanometers, or at least one wavelength in the infrared range of the electromagnetic spectrum, for example within the range of 700 to 1000 nanometers. In examples, the absorbent elements prevent transmission of light of a plurality of wavelengths for at least one angle of incidence, for example a plurality of wavelengths within one or more of the ultraviolet, visible or infrared ranges of the electromagnetic spectrum. In further examples, the given wavelength includes ultraviolet and visible wavelengths, ultraviolet and infrared wavelengths, visible and infrared wavelengths or ultraviolet, visible and infrared wavelengths.

Further examples will now be described with reference to FIGS. 4, 5, 6a and 6b. These examples operate according to similar principles as the previously described examples, namely permitting transmission of the first light ray with the first angle of incidence, but preventing transmission of the second light ray with the second angle of incidence. Corresponding descriptions from previous examples should therefore be taken to apply here also, such as those relating to features of the electrowetting element labelled with the same reference numbers.

Figure 4:
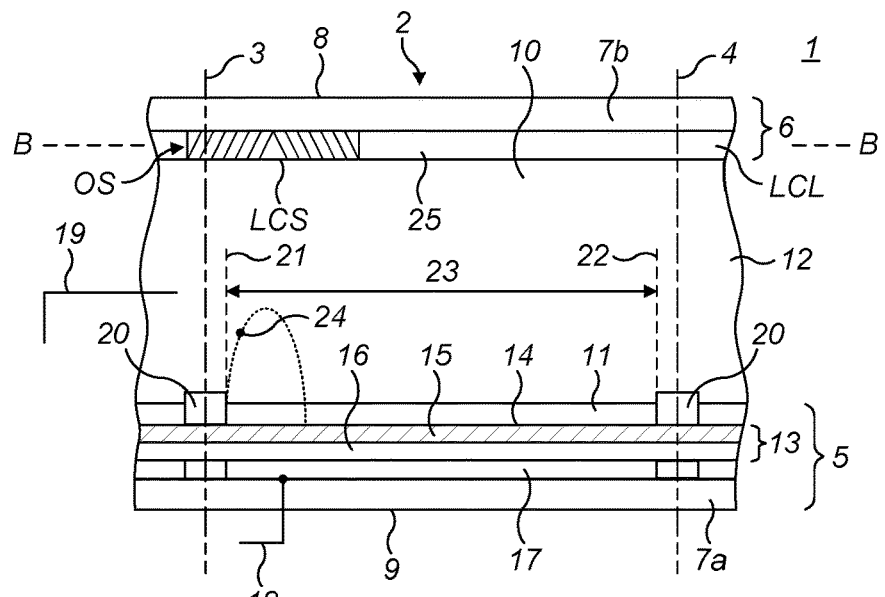
FIG. 4 shows schematically a cross-section of a different example electrowetting element.

Referring to FIG. 4, there is a light conduit layer LCL which comprises also a color filter 25 overlapping a first portion of the first support plate surface. The optical structure also OS comprises a light conduit structure LCS overlapping a second portion of the first support plate surface different from the first portion.

Figure 5:
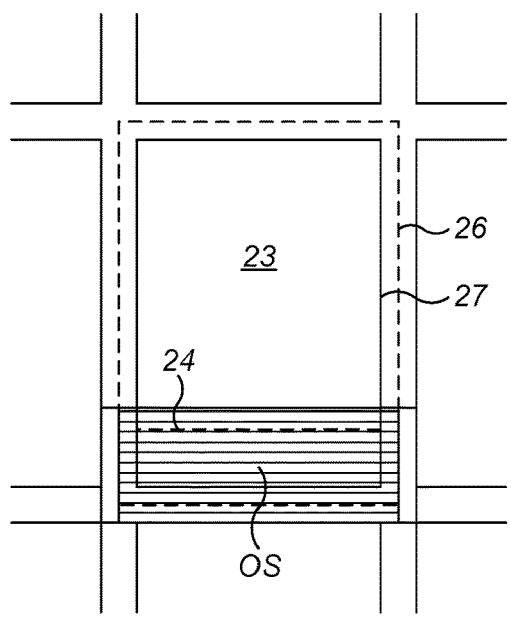
FIG. 5 shows schematically a plan view of the electrowetting element of FIG. 4.
Figure 6A:
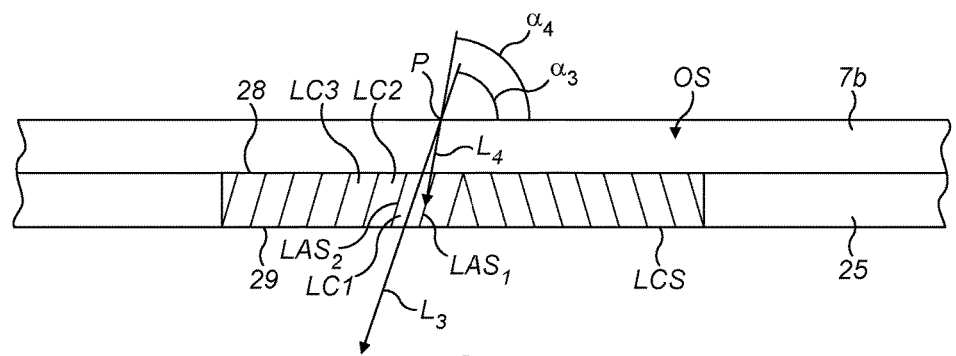
FIGS. 6a and 6b show schematically a cross-section of a different example optical structure.
Figure 6B:
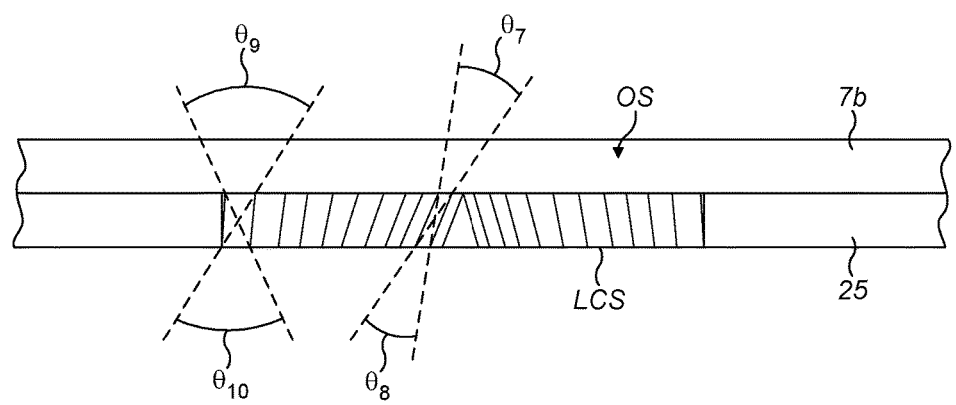

FIG. 5 illustrates the optical structure OS in plan view, taken in plane B - - - B and which in this example comprises a plurality of substantially parallel (in the cross-section of FIG. 5) longitudinal absorbent sheets. FIGS. 6a and 6b will now be referred to for a more detailed explanation.

FIG. 6a illustrates the light conduit layer comprising a first light conduit layer surface 28 and a second light conduit layer surface 29. A plurality of light conduits for example a first, second and third light conduit, LC1, LC2, LC3, each extend along a respective light conduit axis (not illustrated)

from the first light conduit layer side to the second light conduit layer side. A respective light conduit axis of at least one of the plurality of light conduits, for example the first light conduit, or all of the plurality of light conduits, is angled non-perpendicularly with respect to a plane of the second side of the optical structure. Thus, the respective axis or axes are typically at a non-90 degree angle with respect to the plane of the second side. The angle of the respective light axis depends on the particular construction and requirements of the optical structure, but may be for example be at an angle of 80, 70, 60, 50 or 45 degrees relative to the plane of the second side of the optical structure. In other examples the light conduit may be similarly angled with respect to a plane of the first side of the optical structure.

Typically a light conduit is for example a channel, pathway, tube, or guide for light to be transmitted along or through, along a predetermined axis.

Referring to FIG. 6a, a first light ray is similar to that described previously but is labelled here as L3. This first light ray has the first angle of incidence (labelled α3 in this example) and is substantially aligned with the first light conduit axis of the first light conduit LC1, so that the first light ray is transmitted through the first light conduit LC1. In contrast, a second light ray is similar to that described previously but is labelled here as L4. This second light ray has the second angle of incidence (labelled α4 in this example) which is sufficiently not aligned with the first light conduit axis so that the second light ray meets a side (such as an absorbent sheet) of the first light conduit, and is therefore prevented from transmission through the first light conduit LC1.

In examples, each light conduit comprises a light conduit transmissive region between two light absorbent sheets. For example, the first light conduit comprises a first light conduit transmissive region between a first light absorbent sheet LAS1 and a second light absorbent sheet LAS2. Such sheets are each absorbent for light of the given wavelength and extend from the first light conduit layer side to the second light conduit layer side. The first light absorbent sheet lies in a plane substantially parallel a plane of the second light absorbent sheet, for example the sheets are parallel within 10, 5, 2, 1 or 0 degrees. Each sheet extends along an axis perpendicular the plane of the Figure.

In examples, the first light conduit has a light conduit axis with a different orientation from the light conduit axis of the second light conduit, for example such that an orientation of the light axis of corresponding light conduits becomes progressively closer to an orientation perpendicular a plane of the first light conduit surface moving away from a central region of the light conduit layer. Hence, as shown in FIG. 6b, a first light conduit closer to the center has a longer light conduit axis than a second light conduit further from the center. Such a configuration can assist in creating a larger shadow region beneath a central region of the light conduit layer compared with a more peripheral region of the light conduit layer. Moreover, relative to the perpendicular orientation, a light conduit axis may have a positive or negative angular value, depending on whether the light conduit is located on one side of a center of the light conduit layer as illustrated in FIG. 6b. Hence as the light conduits extend from the first light conduit layer side to the second light conduit layer side, the light conduits are orientated in a direction heading away from the center. Thus, in the center, two central light conduits may meet at an apex at the first conduit layer side.

In some examples a respective width of the light conduits increases progressively away from the central region, for example due to an increase in spacing between adjacent light absorbent sheets. As shown in FIG. 6b, each light conduit has a range of angles of incidence for which light may be transmitted through the respective light conduit. Thus, one range nearer the central region, and illustrated with angles θ7 and θ8 between dashed lines, is smaller than another range further from the central region which is illustrated with angles θ9 and θ10 between dashed lines. With the larger range of angles of incidence, compared with the smaller range nearer the central region, a greater amount of light can be transmitted through the light conduit layer further away from the central region.

It is to be appreciated that the light transmissive properties of the light conduit layer may be designed in dependence on for example a width, orientation, length, or number of light conduits, for example.

Typically, in the examples of FIGS. 6a and 6b, the light absorbent sheets are for example each a layer of material, which may be planar, which is absorbent for the given wavelength. Such sheets may also be referred to as lamellas or membranes. These lamellas may be formed of a photoresist material such as SU8 and comprising for example a light absorbing material such as carbon black. The orientation of the sheets may be determined using a photolithography process with an appropriate mask, as the skilled person will understand.

In other examples it is envisaged that the sides of a light conduit may not be absorbing but may be reflective to redirect light rays of certain angles of incidence to a different axis so as to be transmitted through the light conduit, or between opposing reflective surfaces to redirect light rays using total internal reflection.

Hence, in some examples, the optical structure has a light conduit extending along a light conduit axis from a first side to a second side of the optical structure, with the light conduit having a reflective surface configured to redirect light of the given wavelength at least partly through the light conduit. So, a first light ray of the given wavelength with a first angle of incidence (e.g. so the first light ray travels in a direction coincident with the light conduit axis) is transmissible through the light conduit substantially coincident with (e.g. within 5 degrees or less deviation from) the light conduit axis. In contrast, a second light ray of the given wavelength, incident on the first side with a second angle of incidence strikes the reflective surface of the light conduit. The reflective surface redirects, by reflection, the second light way at least partly along the light conduit, for example inwardly into a transmissive region of the light conduit and towards an opposing portion of the reflective surface of the light conduit, for further reflection or in a direction substantially coincident with the light conduit axis. Thus, light may be guided through the light conduit by total internal reflection. The optical structure may have a plurality of such light conduits, which may be orientated as described in examples described previously.

In such examples, the optical structure has a first sheet with a first reflective surface for light of the given wavelength may extend from the first to the second light conduit layer sides. Similarly, a second sheet with a reflective surface (referred also as a second reflective surface) for light of the given wavelength may extend from the first to the second light conduit layer sides. The first and second sheets each lie for example in a plane substantially parallel to a plane of the other sheet. A first light conduit of a plurality of light conduits has for example a first light conduit transmissive region (similar to that described in earlier examples) between the first and second reflective surfaces. With appropriate orientation and reflectivity of the first and second reflective surfaces, a light ray may be totally internally reflected within the light guide conduit, between the first and second reflective surfaces, so as to be transmitted through the optical structure, but redirected compared with its original angle of incidence. Some light may nonetheless be prevented from transmission through the optical structure, if for example light rays with a certain angle of incidence on one of the first and second reflective surfaces are reflected back away from the light conduit rather than being redirected through the light conduit.

In some envisaged examples with reflective surfaces, the first light conduit transmissive region is formed of a first material with a first refractive index. The first sheet and the second sheet are each formed of a second material with a second refractive index different from the first refractive index. In other examples the first and second sheets may be formed of different materials with different refractive indexes. The difference between the first and second refractive indexes may be selected to determine a reflectivity of the first and second reflective surfaces, caused by the change of refractive index at the interface between first and second materials. Selecting this difference hence determines the extent that light is redirected through the optical structure, compared with light which is prevented from transmission through the optical structure, for example due to absorption.

It is to be appreciated that although sheets are described for such reflective surface examples, such a reflective surface of a light conduit may be of a different shape, for example if the light conduit has a different form, for example a tube or other conduit shape.

In examples, the location of the optical structure in the second support plate forms a pattern for a plurality of electrowetting elements of a matrix such that the optical structure covers the corresponding same portion of the display area for each of the plurality of electrowetting elements. The pattern may be a regular or repeating arrangement of the optical structure in the second support plate of the plurality of picture elements. Further, examples are described with the optical structure as part of the second support plate. In other examples, such an optical structure may be part of the first support plate, for example in a transmissive electrowetting element, to redirect light from a backlight so as for example not to be incident on components sensitive to light damage. In further envisaged examples, the optical structure may be a different part of an electrowetting element than comprised by a first or second support plate. For example, the optical structure may be any layer in a layer stack which together at least partly forms an electrowetting element. In such examples, the features which together are considered to be part of an electrowetting element may include layers above or below support plates of the electrowetting element, for example a layer between a first or second support plate and a backlight.

Examples are described in the context of an electrowetting display element. It is to be appreciated that in further examples the optical structure may be used in a display element using a different technology than electrowetting to provide a display effect. In such examples, such a display element may have a configurable medium configurable using an applied voltage to provide a display effect. The configurable medium may be disposed between a first and second support plate, with at least one such plate comprising an electrode for use in applying the applied voltage. In some examples, as the skilled person will appreciate, the configurable medium comprises a liquid crystal material (where the display element is for example a liquid crystal display (LCD)), whereas in other examples the configurable medium comprises movable charged particles (where the display element is for example an electrophoretic display (EPD)). In electrowetting element examples described above, it is to be appreciated that such a configurable medium comprises the first fluid.

The above examples are to be understood as illustrative examples. Further examples are envisaged.

Figure 7:
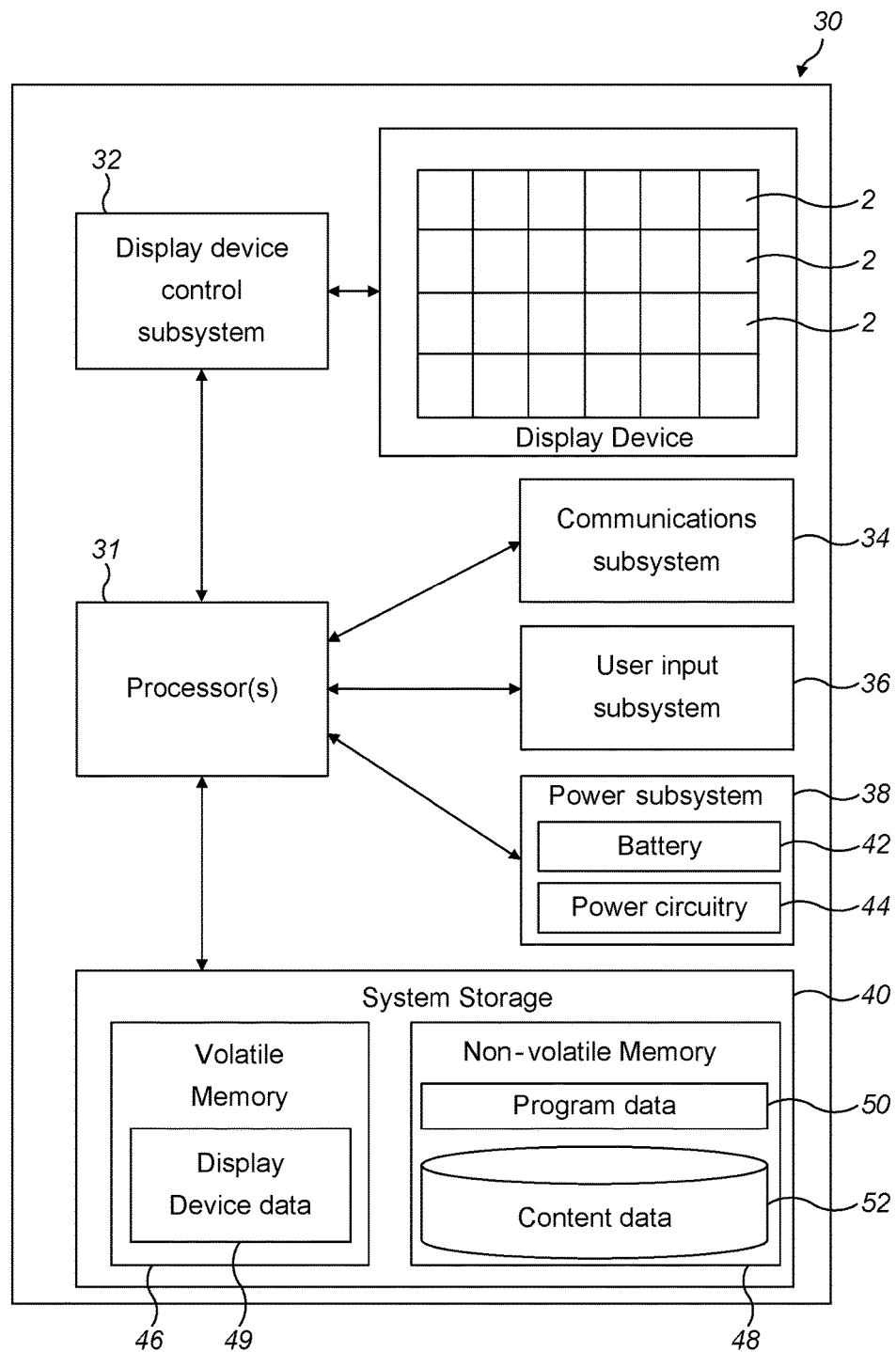
FIG. 7 shows a schematic system diagram of an example apparatus including an electrowetting display device.

FIG. 7 shows schematically a system diagram of an example system, for example apparatus 30, comprising an electrowetting display device such as the electrowetting display device 1 described above comprising electrowetting display elements 2. The apparatus is for example a portable, for example mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 30. The apparatus includes at least one processor 31 connected to and therefore in data communication with for example: a display device control subsystem 32, a communications subsystem 34, a user input subsystem 36, a power subsystem 38 and system storage 40. The display device control subsystem is connected to and is therefore in data communication with the display device 1. The at least one processor 31 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 40. The at least one processor may additionally, or in the alternative, contain memory, such as processor registers.

The display device control subsystem 32 for example includes electrowetting display element driver components, for use in applying a voltage to any of the electrowetting display elements, to address different such display elements. In examples the electrowetting display elements are configured according to an active matrix configuration and the display device control subsystem is configured to control switching elements such as thin film transistors (TFTs) of the display device 1 via circuitry to control the electrowetting display elements. The circuitry may include signal and control lines such as those described above.

The communications subsystem 34 for example is configured for the apparatus to communicate with for example a computing device via a data network, for example a computer network such as the Internet, a local area network, a wide area network, a telecommunications network, a wired network, a wireless network, or some other type of network. The communications subsystem 34 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 36 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 38 for example includes power circuitry 42 for use in transferring and controlling power consumed by the apparatus. The power may be provided by a mains electricity supply or from a battery 44, via the power circuitry. The power circuitry may further be used for charging the battery from a mains electricity supply.

The system storage 40 includes at least one memory, for example at least one of volatile memory 46 and non-volatile memory 48 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, for example computer program instructions. Therefore, the at least one memory and the computer program instructions may be configured to, with the at least one processor, control a display effect provided by the electrowetting display device.

In the example of FIG. 7, the volatile memory 46 stores for example display device data 49 which is indicative of display effects to be provided by the display device 1. The processor 31 may transmit data, based on the display device data, to the display device control subsystem 32 which in turn outputs signals to the display device for applying voltages to the display elements, for providing display effects from the display device. The non-volatile memory 48 stores for example program data 50 and/or content data 52. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

It is to be understood that any feature described in relation to any one example may be used alone, or in combination with other features described and may also be used in combination with one or more features of any other of the example, or any combination of any other of the examples. Furthermore, equivalents and modifications not described above may also be employed without departing from the scope of the accompanying claims.

What is claimed is:
1. A display element comprising:
 a configurable medium configurable using an applied voltage to provide a display effect;
 a first support plate comprising:
  a first support plate surface in contact with the configurable medium, and
  an electrode for use in application of the applied voltage to the configurable medium;
 a second support plate; and
 an optical structure comprising:
  a first side of the optical structure;
  a second side of the optical structure;
  a first absorbent element absorbent for light of a given wavelength;
  a second absorbent element absorbent for light of the given wavelength;
  a third absorbent element absorbent for light of the given wavelength;
  a first transmissive region between the first absorbent element and the third absorbent element, a width of the first transmissive region corresponding to a spacing between the first absorbent element and the third absorbent element; and
  a transmissive layer transmissive to light of the given wavelength and located between the first absorbent element and the second absorbent element, the first absorbent element located between the first side and the transmissive layer, and the second absorbent element located between the second side and the transmissive layer, the transmissive layer having a first transmissive layer side and a second transmissive layer side, the first absorbent element and the third absorbent element located at the first transmissive layer side, and the second absorbent element located at the second transmissive layer side.

2. The display element according to claim 1, wherein the second support plate comprises the optical structure, the second side closer to the first support plate than the first side.

3. The display element according to claim 1, where the optical structure comprises a first transmissive portion between the first absorbent element and the second absorbent element, a size of the first transmissive portion determined by at least one of:
   a separation between the first absorbent element and the second absorbent element, or
   a thickness of the transmissive layer.

4. The display element of claim 1, wherein the first absorbent element has a first lateral extent which at least partly overlaps a second lateral extent of the second absorbent element.

5. The display element according to claim 1, wherein the second absorbent element has a second lateral extent which at least partly overlaps a lateral extent of the first transmissive region.

6. The display element according to claim 1, wherein the optical structure further comprises:
   a fourth absorbent element absorbent for light of the given wavelength and located at the second transmissive layer side of the transmissive layer;
   a second transmissive region between the second absorbent element and the fourth absorbent element,
   wherein a width of the second transmissive region corresponds to a spacing between the second absorbent element and the fourth absorbent element.

7. The display element according to claim 1, wherein the optical structure comprises a second transmissive portion between the second absorbent element and the third absorbent element, a size of the second transmissive portion determined by at least one of:
   a separation between the second absorbent element and the third absorbent element, or
   a thickness of the transmissive layer.

8. The display element according to claim 1, wherein the optical structure comprises:
   a first plurality of absorbent elements arranged according to a first pattern, the first plurality of absorbent elements comprising the first absorbent element; and
   a second plurality of absorbent elements arranged according to a second pattern, the second plurality of absorbent elements comprising the second absorbent element,
   each of the first plurality of absorbent elements and each of the second plurality of absorbent elements comprising a respective longitudinal absorbent element comprising a photoresist material.

9. The display element according to claim 8, wherein
   each of the first plurality of absorbent elements are substantially parallel to each other and separated from a respective adjacent absorbent element of the first plurality of absorbent elements by a respective transmissive region; and
   each of the second plurality of absorbent elements are substantially parallel to each other and separated from a respective adjacent absorbent element of the second plurality of absorbent elements by a respective transmissive region.

10. The display element according to claim 1, wherein the first absorbent element is positioned relative to the second absorbent element such that:
    a first light ray of the given wavelength is transmissible from the first side to the second side, via the transmissive layer, the first light ray incident on a point of the first side with a first angle of incidence; and
    a second light ray of the given wavelength is preventable from transmission from the first side to the second side, via the transmissive layer, the second light ray incident on the point of the first side with a second angle of incidence.

11. The display element according to claim 1, wherein the display element is an electrowetting element with:
    the configurable medium comprising a first fluid, the electrowetting element further comprising a second fluid immiscible with the first fluid, and
    the first support plate surface in contact with at least one of the first fluid or the second fluid, and the electrode at least partly overlapped by the first support plate surface.

12. The display element according to claim 11, wherein the first fluid is retractable to occupy a fluid retraction region between the first support plate and the second support plate upon application of the applied voltage, the optical structure located to overlap the fluid retraction region such that at least one of the first absorbent element or the second absorbent element prevents transmission of a light ray of the given wavelength from the first side to the second side in a direction towards the fluid retraction region.

13. The display element according to claim 1, wherein at least a portion of the second absorbent element is non-overlapped by the first absorbent element.

* * * * *